(12) United States Patent
Coyle et al.

(10) Patent No.: US 11,257,027 B2
(45) Date of Patent: Feb. 22, 2022

(54) METHODS AND SYSTEMS FOR SELECTING AN END TO END FREIGHT SERVICE

(71) Applicant: Flexport, Inc., San Francisco, CA (US)

(72) Inventors: Andrew Coyle, San Francisco, CA (US); Sean Linehan, San Francisco, CA (US); Brian Cameros, San Francisco, CA (US); Cody Joseph Krainock, San Francisco, CA (US)

(73) Assignee: Flexport, Inc., San Francisco, CA (US)

( * ) Notice: Subject to any disclaimer, the term of this patent is extended or adjusted under 35 U.S.C. 154(b) by 262 days.

(21) Appl. No.: 15/826,410

(22) Filed: Nov. 29, 2017

(65) Prior Publication Data

US 2018/0150797 A1     May 31, 2018

Related U.S. Application Data

(60) Provisional application No. 62/560,603, filed on Sep. 19, 2017, provisional application No. 62/557,741, filed on Sep. 12, 2017, provisional application No. 62/555,593, filed on Sep. 7, 2017, provisional application No. 62/428,459, filed on Nov. 30, 2016.

(51) Int. Cl.
    *G06Q 10/08*         (2012.01)
    *G06Q 50/28*         (2012.01)
    *G06F 3/0482*       (2013.01)

(52) U.S. Cl.
    CPC ..... *G06Q 10/08345* (2013.01); *G06F 3/0482* (2013.01); *G06Q 10/08355* (2013.01); *G06Q 50/28* (2013.01)

(58) Field of Classification Search
    CPC ......... G06Q 30/0282; G06Q 10/08345; G06Q 10/08355; G06Q 50/28; G06F 3/0482

USPC .......................................................... 705/334
See application file for complete search history.

(56) References Cited

U.S. PATENT DOCUMENTS

| | | | | |
|---|---|---|---|---|
| 2004/0044469 A1* | 3/2004 | Bender | ................... | G09B 29/00 701/532 |
| 2007/0088897 A1* | 4/2007 | Wailes | ..................... | G06F 16/29 711/3 |
| 2011/0060696 A1* | 3/2011 | Podgurny | .............. | G06Q 10/08 705/330 |
| 2011/0161241 A1* | 6/2011 | Jani | ................... | G06Q 10/08345 705/338 |
| 2015/0278758 A1* | 10/2015 | Kim | ................... | G06Q 10/08355 705/338 |
| 2016/0048803 A1* | 2/2016 | Cen | ................... | G06Q 10/08355 705/338 |
| 2016/0335593 A1* | 11/2016 | Clarke | ............... | G06Q 10/0833 |

(Continued)

OTHER PUBLICATIONS

"Determination of an economical shipping route considering the effects of sea state for lower fuel consumption" Published by Department of the Naval Architecture and Ocean Engineering and Research Institute of Marine System Engineering in 2013 (Year: 2013).*

*Primary Examiner* — Zeina Elchanti
(74) *Attorney, Agent, or Firm* — Hickman Becker Bingham Ledesma LLP

(57) ABSTRACT

This disclosure pertains to methods and systems for selecting an end to end freight service. In one embodiment, the methods and systems disclosed herein allow for rapid and efficient selection of freight services for moving mass. In one embodiment, the methods and systems disclosed herein comprise normalizing freight service options.

18 Claims, 9 Drawing Sheets

(56) References Cited

U.S. PATENT DOCUMENTS

2017/0061376 A1* 3/2017 Wagner .............. G06Q 10/0838
2017/0372263 A1* 12/2017 Kim ................... G06Q 10/0834

* cited by examiner

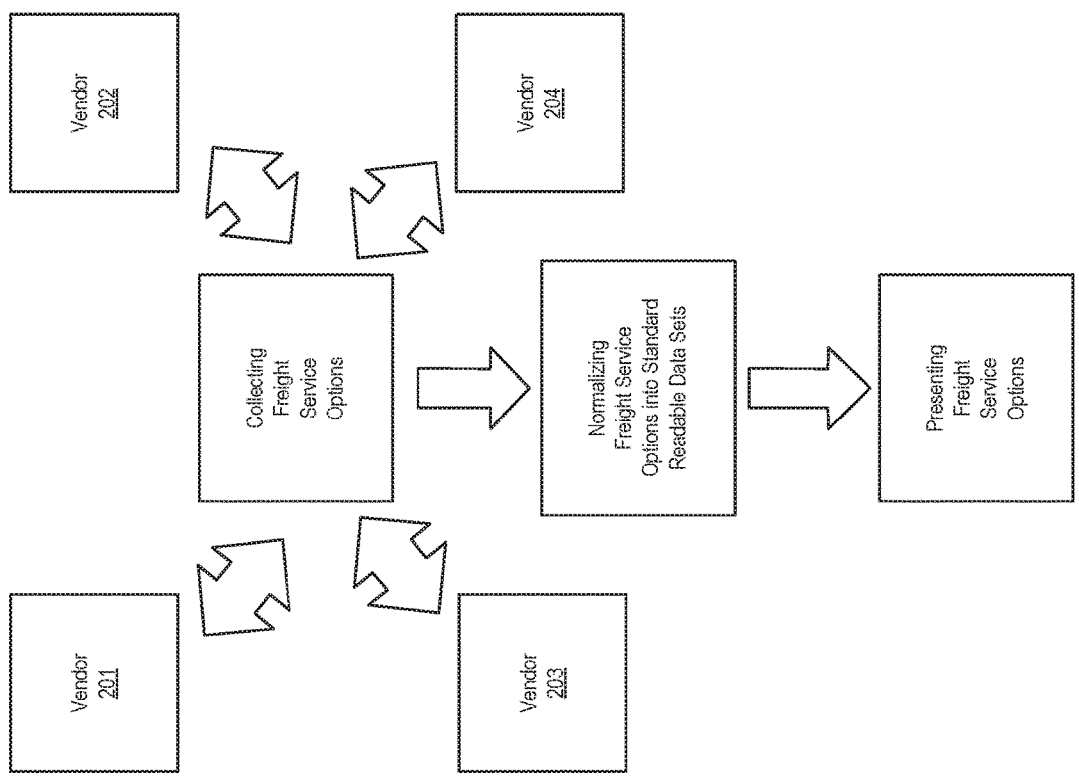

METHODS AND SYSTEMS FOR SELECTING AN END TO END FREIGHT SERVICE

CROSS REFERENCE TO RELATED APPLICATIONS

This application claims priority on the basis of U.S. Provisional Application No. 62/428,459 filed Nov. 30, 2016, U.S. Provisional Application No. 62/555,593 filed Sep. 7, 2017, U.S. Provisional Application No. 62/557,741 filed Sep. 12, 2017, and U.S. Provisional Application No. 62/560,603 filed Sep. 19, 2017, all of which are hereby incorporated by reference in their entirety.

TECHNICAL FIELD

This disclosure relates to the freight service industry. In particular, this disclosure relates to methods and systems for choosing an end to end freight service.

BACKGROUND

The advent of an E-commerce market and improved global communications offers businesses the opportunity to operate and provide services anywhere in the world. As such, shipping products from a warehouse in the United States to a customer in China is an everyday occurrence. In fact, operating on an international scale is imperative for growing and developing a business.

Transporting goods from one country to another is a growing trend for many businesses. However, the advances in technology have yet to make an impact on the logistics side of transporting goods. Most shipping logistics are handled by physical bookkeeping and manually contacting shipping companies via telephone, email, fax, etc., to receive quotes for their services. Then, the rates are compared from all the companies to determine the best price. These methods are convoluted, messy, and time consuming. This approach to handling shipping matters stalls growth and may ruin a business, especially concerning to freight shipping.

Large scale shipping requires moving large amounts of goods (books, electronic devices, cars, etc.) using a freight, a large storage container suitable for holding large amounts of mass. Shipping by air, land, water, or some combination thereof becomes complicated on the large scale commonly practiced in the freight shipping industry. One wrong decision (or poor execution of a decision) hinders the development of a business by not meeting the demands of customers, keeping goods in stock, managing a supply chain effectively, etc. Not only are the many current methods inefficient, the cost associated with their implementation is expensive and wasteful.

There exists a need for quickly and easily selecting end to end freight services. There also exists a need for comparing various options and services without expending resources by individually and/or personally contacting multiple service providers. There also exists a need for comparing various services in a timely and efficient manner.

BRIEF DESCRIPTION OF THE DRAWINGS

FIG. 2 is an illustrative example of collecting freight service options from Vendor 201, 202, 203, and 204 and normalizing those freight service options into standard readable data sets and presenting the standard readable data set to a user and/or client.

DETAILED DESCRIPTION

Figure 1A:
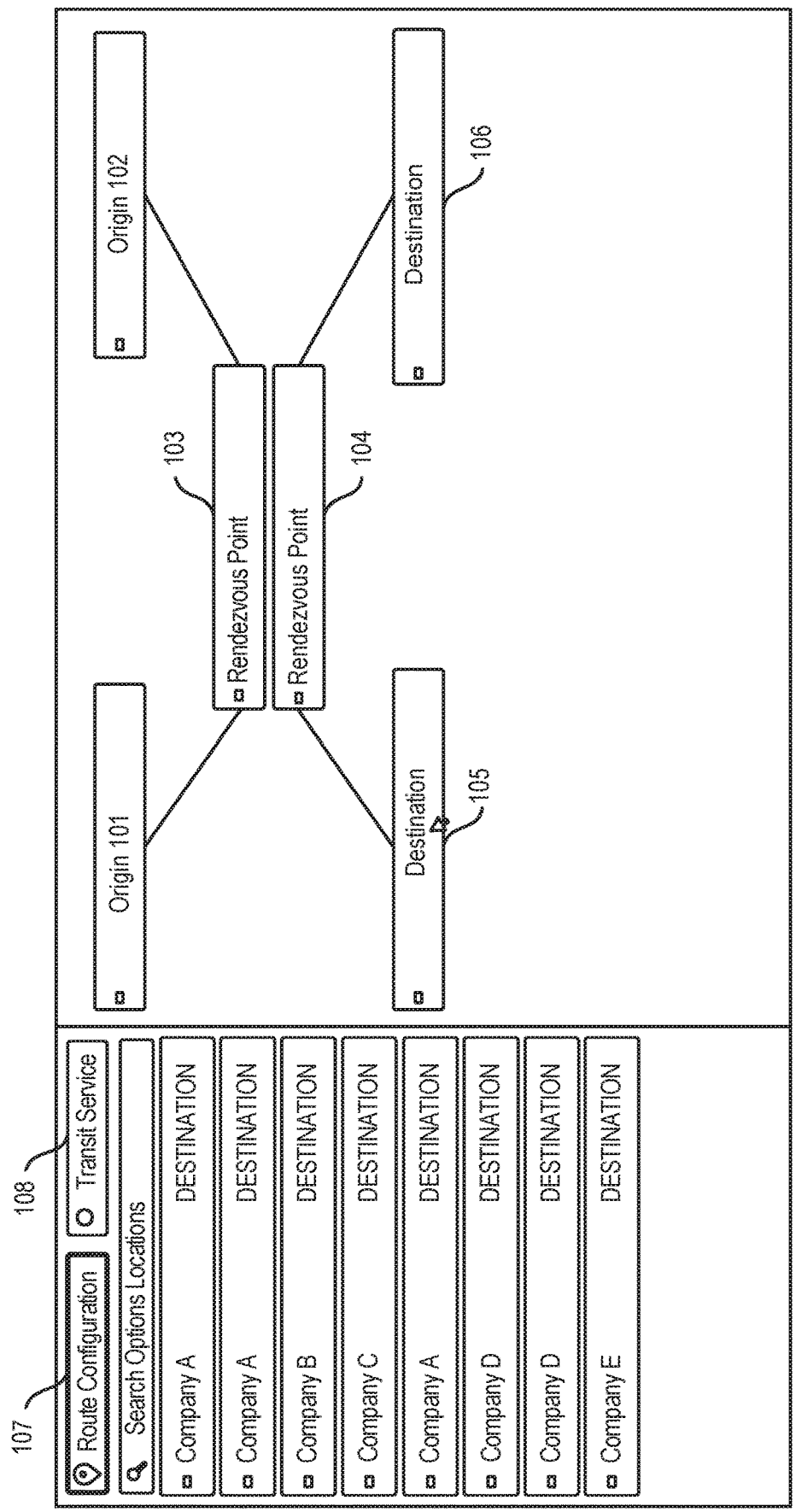
FIG. 1A is an illustrative example of a hub and spoke configuration. Mass is moved from Origin 101 and Origin 102 to Rendezvous Point 103. The mass is then moved to Rendezvous Point 104 where mass is distributed to Destination 105 and Destination 106. Route Configuration Menu 107 provides a collection of Origin and Destinations while Transit Service Menu 108 provides a collection of Freight Service Options.

Disclosed herein are new methods and systems for selecting an end to end freight service. In one embodiment, the methods and systems disclosed herein automatically gather information for creating an end to end freight service for moving mass. In one embodiment, the methods and systems disclosed herein automatically create multiple end to end freight services for moving mass. In one embodiment, the methods and systems disclosed herein facilitate the movement of mass from one location to another location. In one embodiment, the methods and systems disclosed herein facilitate the movement of mass from two or more locations to a single location. In one embodiment, the methods and systems disclosed herein coordinate the movement of mass from two or more locations to two or more locations.

Disclosed herein are new methods and systems for comparing freight service options collected from one or more vendors. In one embodiment, the methods and systems disclosed herein comprise a Physical, Tangible Display Means, e.g., a computer, a screen, a mobile device, a printed document, etc. In one embodiment, a concrete representation of an end to end freight service is presented on a Physical, Tangible Display Means. In one embodiment, a user and/or client interacts with a Physical, Tangible Display Means to select an end to end freight service, e.g., a client interacting with a graphical user interface, a user manipulating a concrete representation of an end to end freight service, a user manipulating the arrangement of a concrete representation of an end to end freight service, etc.

Disclosed herein are new methods and systems for transforming information into a concrete representation. In one embodiment, the methods and systems disclosed herein automatically collect and transform data into a concrete representation. In one embodiment, the methods and systems disclosed herein collect input from a user and/or client. In one embodiment, the methods and systems disclosed herein prompt a user and/or client for input, e.g., soliciting information regarding the preference of transportation method, range of cost, preferred date of arrival, etc. In one embodiment, the methods and systems disclosed herein compare user inputted information and the transformed data to create a concrete representation of an end to end freight service. In one embodiment, a user and/or client manipulates the concrete representation of an end to end freight service, e.g., a client interacting with a graphical user interface, a user manipulating a concrete representation of an end to end freight service, a user manipulating the arrangement of a concrete representation of an end to end freight service, etc.

As used herein, the term "client" (within the context of a freight services client) refers to an entity possessing, controlling, and/or owning a Physical, Concrete and Tangible Object requiring one or more freight services. In one embodiment, a client uses the methods and systems disclosed herein to move a Physical, Concrete and Tangible Object from one geographic location to another geographic location. In one embodiment, a user (other than the client) of the systems and/or methods disclosed herein assists a client with moving a Physical, Concrete and Tangible Object from one physical location to another physical location. In one embodiment, the methods and systems disclosed herein collect information about a particular mass requiring movement and automatically create an end to end freight service for moving the mass from one location to another location.

In one embodiment, the methods and systems disclosed herein operate based on a client's preference. Within the context of this disclosure, a "client's preference" refers to a parameter or parameters for which the methods and systems disclosed herein operate within. In one embodiment, a client's preference determines the freight service options chosen for moving mass. In one embodiment, the methods and systems disclosed herein utilize a client's preference for eliminating freight service options. In one embodiment, the methods and systems disclosed herein utilize a client's preference for filtering freight service options. In one embodiment, the methods and systems disclosed herein utilize a client's preference for sorting freight service options. In one embodiment, the methods and systems disclosed herein utilize a client's preference for ranking freight service options. In one embodiment, the methods and systems disclosed herein utilize a client's preference for recommending freight service options. Within the context of this disclosure, exemplary client's preference are, but are not limited to, price range, date of arrival, preferred vendor, carbon emissions, method of transportation, time in transit, hazmat requirements, etc.

In one embodiment, the methods and systems disclosed herein operate based on a requirement. Within the context of this disclosure, a "requirement" is a condition necessary for the methods and systems disclosed herein to move mass. In one embodiment, a requirement is the selection of a beginning geographical location, e.g., an origin. In one embodiment, a requirement is the selection of a final geographical location, e.g., a destination. In one embodiment, a requirement is a client's preference, e.g., the selection of a language for presenting a standard readable data set, a price range of freight service options, a range of dates of arrival, ecological impact, etc. In one embodiment, a requirement is inputting the amount of mass. In one embodiment, the methods and systems disclosed herein prompt a user and/or client for a requirement, e.g., sending an email, sending an in app alert, calling a client and/or user, sending a fax, etc. In one embodiment, the methods and systems disclosed herein recognize a requirement and operate independent of a user and/or client, e.g., a client and/or user selects a price range and the methods and systems disclosed herein select freight service options within that price range, a client and/or user selects preferred vendors and the methods and systems disclosed herein collect freight service options from those vendors, etc. In one embodiment, a requirement is changed, e.g., selecting a new price range, increasing the amount of mass, choosing new vendors, etc.

As used herein, the term "user" refers to an entity practicing the methods or using the systems as disclosed herein. Within the context of this disclosure, the term "user" includes a person interacting with software, for example a service provider facilitating the movement of mass from one location to another location. In one embodiment, a user utilizes the methods and systems disclosed herein to facilitate the movement of mass from one location to another location. In one embodiment, a user prompts a client for information, e.g., a route for moving mass, a date of arrival, preferred method of transportation, price range, carbon emissions, an origin, a destination, time in transit, hazmat requirements, etc. In one embodiment, a user is a freight forwarder assisting an entity with moving mass.

Disclosed herein is a method for selecting an end to end freight service, comprising:
  collecting a freight service option from a vendor;
  normalizing the freight service option into a standard readable data set;
  acquiring a route configuration;
  analyzing the route configuration and generating a list of relevant options from the standard readable data set; and
  presenting the list of relevant options on a Physical, Tangible Display Means.

As used herein, the term "freight service option" refers to an offer from an entity for moving mass. Within the context of this disclosure, a "freight service option" includes any offer for moving mass involving traveling by water, air, ground, or any combination thereof. In one embodiment, a freight service option comprises an offer to move mass via a ship. In one embodiment, a freight service option comprises an offer to move mass via a truck. In one embodiment, a freight service option comprises an offer to move mass via an airplane. In one embodiment, a freight service option comprises an offer to move mass via a train. In one embodiment, a freight service option comprises an offer to move via a combination of a truck, airplane, ship, and/or train. In one embodiment, a freight service option comprises a concrete presentation of the offer, e.g., a paper copy, an email on a screen, etc. In one embodiment, a freight service option is presented in a variety of formats, languages, currencies, rates, etc.

In one embodiment, the methods and systems disclosed herein determine the fastest and/or rank the fastest freight service options for moving mass to a client's desired location. In one embodiment, the methods and systems disclosed herein determine the highest rated and/or rank the highest rated freight service options for moving mass. In one embodiment, the methods and systems disclosed herein provide a recommendation and/or rank recommendations of freight service options for moving mass. In one embodiment, the methods and systems disclosed herein provide a recommendation and/or rank recommendations for moving mass based on a client's preference, e.g., fastest method of movement, most cost effective method, quality of service, history of completion of service, etc. In one embodiment, the methods and systems disclosed herein provide multiple recommendations and/or rank multiple recommendations of freight service options. In one embodiment, the methods and systems disclosed herein provide recommendations by analyzing historical data, e.g., the number of Physical, Concrete and Tangible Objects transported within a time period, the route traveled, the type of service used, the vendors used, the string traveled along, the price of previous services, etc.

As used herein, the term "collecting a freight service option" refers to gathering, accumulating, and/or assembling an offer from an entity or a collection of entities for moving mass. In one embodiment, collecting a freight service option comprises collecting all the information about each vendor, offer price, weight load limitations, method of transportation, fueling costs, customs fees, availability of space, discounts, route permit, shipment fulfillment history, reviews, business history, etc. In one embodiment, the methods and systems disclosed herein automatically collect freight service options from vendors, e.g., searching offers through an application program interface, soliciting offers from vendors, receiving unsolicited offers from vendors, etc.

In one embodiment, the methods and systems disclosed herein collect freight service options daily. In one embodiment, the methods and systems disclosed herein collect freight service options weekly. In one embodiment, the methods and systems disclosed herein collect freight service options monthly. In one embodiment, the methods and systems disclosed herein collect freight service options yearly. In one embodiment, the methods and systems disclosed herein collect freight service options in real.

As used herein, the term "real time" refers to an event occurring contemporaneously, e.g., an event presently occurring in the natural world or a current up to date state or condition. Within the context of this disclosure, term "real time" is understood to not mean the exact time an event occurs, e.g., the delay in time for recording the occurrence of an event to a computer, the difference in time from witnessing an event and registering the event, etc. In one embodiment, any discrepancy in time measurements is negligible.

In one embodiment, the methods and systems disclosed herein collect freight service options in real time to provide a client the most comprehensive collection of freight service options for creating an end to end freight service. Vendors vary dramatically in terms of how much mass they are able to move, when they can move mass, the amount they charge, etc., due to different transportation methods, availability of space, laws and regulations, etc. In one embodiment, the methods and systems disclosed herein select the most appropriate freight service option for moving mass.

Figure 5:
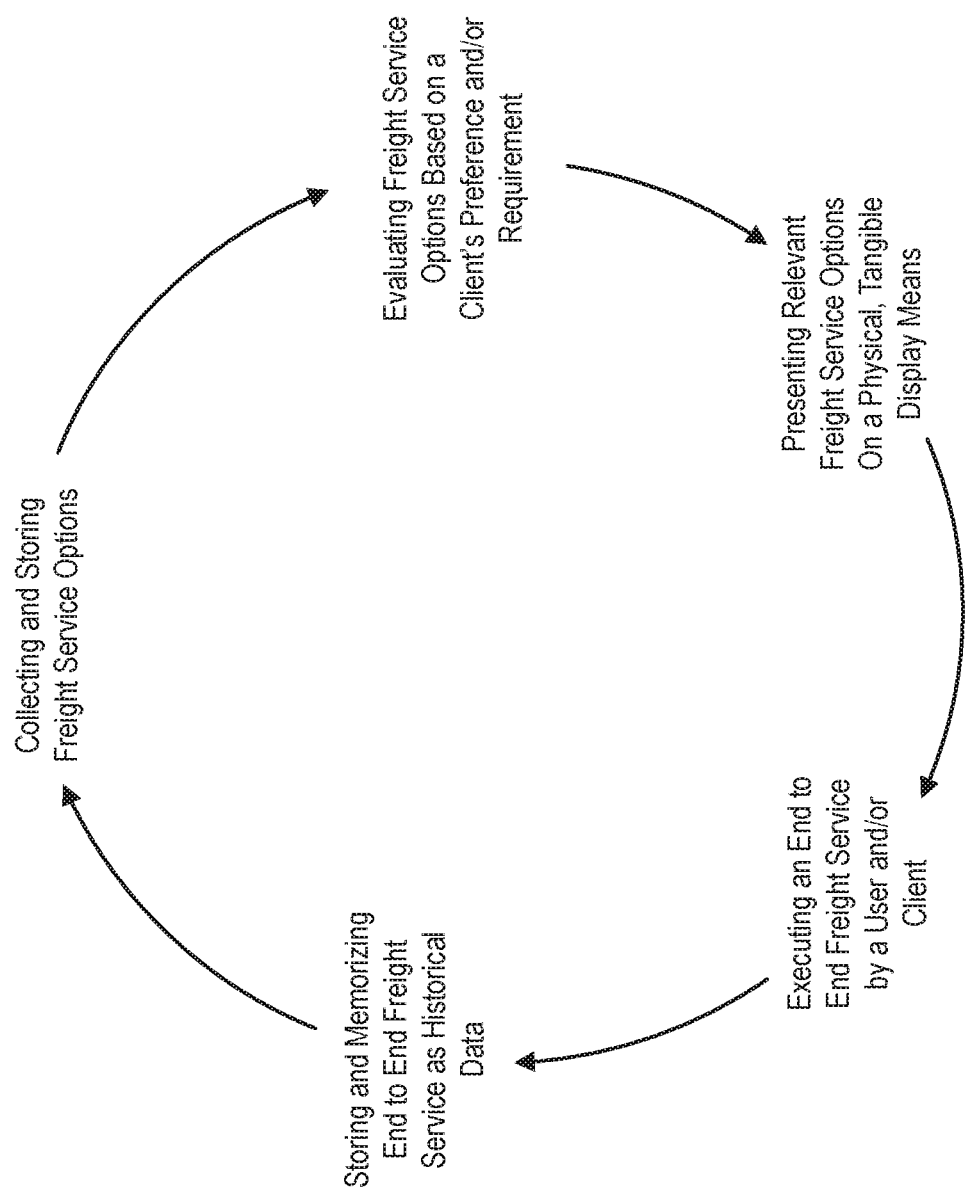
FIG. 5 is an illustrative example of how the methods and systems disclosed herein process information to continuously create opportunities for creating the most efficient end to end freight service for a client.

FIG. 5 is an illustrative example of how the methods and systems disclosed herein process information to continuously create opportunities for creating the most efficient end to end freight service for a client. In this example, the methods and systems disclosed herein collect and store freight service options. The freight service options are evaluated according to a client's preference and/or requirement, e.g., a route configuration, ecological impact, price range, weight limitations, method of transportation, etc. The methods and systems disclosed herein present the relevant freight service options on a Physical, Tangible Display Means and execute an end to end freight service selected by a user and/or client. Once an end to end freight service is selected, all information regarding the end to end freight service is reserved and used as historical data for future use.

As used herein, the term "vendor" refers to a seller of a good and/or a service relevant to moving mass from one location to another location. In one embodiment, a vendor has a previous business relationship with a client. In one embodiment, a vendor is a new entity. In one embodiment, a vendor is a lawyer offering legal services. In one embodiment, a vendor is an entity offering to sell of supplies. In one embodiment, a vendor is an entity offering to sell products. In one embodiment, a vendor is an entity offering to facilitate the movement of mass from one location to another location, e.g., offering a vessel for moving mass, offering a container for moving mass, offering a service for moving mass, etc. In one embodiment, the methods and systems disclosed herein procure a service, supply, and/or product from a vendor. In one example, a user of the methods and systems disclosed herein purchase a service, supply, and/or product from a vendor on behalf of a client. In one embodiment, the methods and systems disclosed herein record a purchase from a vendor. In one embodiment, the methods and systems disclosed herein recommend vendors of comparable quality, e.g., utilizing historical data of client satisfaction of a vendor's service, number of successful shipments by a vendor, comparable rates of vendors, etc.

In some embodiments, a vendor may not offer all the freight services required for moving mass from one location to another, e.g., a vendor only offers to move mass by ship when an airplane is also necessary. Thus, two or more vendors are needed to accomplish the movement of mass. In one embodiment, the methods and systems disclosed herein automatically create a compilation of freight service options from two or more vendors. This compilation of freight service options eliminates the need for a client to manually and individually contact multiple vendors to request a freight service option or a collection of freight service options for moving mass from one location to another location.

In one embodiment, the methods and systems disclosed herein collect a freight service option from a vendor as a standing offer.

As used herein, the term "standing offer" refers to a proposal of services that is a valid for a period of time, subject to one or more conditions. In one embodiment, a standing offer is for a set period of time. Within the context of this application, the "set period of time" could be virtually any period of time agreed upon by the parties in the negotiation. In one embodiment, a standing offer is for one day. In one embodiment, a standing offer is for one week. In one embodiment, a standing offer is for one month. In one embodiment, a standing offer is for 3 months.

In one embodiment, a freight service option collected by the methods and systems disclosed herein is a standing offer for a number of shipments. In one embodiment, a freight service option collected by the methods and systems disclosed herein is a standing offer for 1-5 shipments. In one embodiment, a freight service option collected by the methods and systems disclosed herein is a standing offer for 1-10 shipments. In one embodiment, a freight service option collected by the methods and systems disclosed herein is a standing offer for 1-15 shipments. In one embodiment, a freight service option collected by the methods and systems disclosed herein is a standing offer for 5-10 shipments. In one embodiment, a freight service option collected by the methods and systems disclosed herein is a standing offer is for 10-15 shipments. In one embodiment, a freight service option collected by the methods and systems disclosed herein is a standing offer for a range of transactions. In one embodiment, a freight service option collected by the methods and systems disclosed herein is a standing offer for 1-5 shipments but a different standing offer for 5-10 shipments from the same vendor, e.g., cheaper rates for more shipments, different weight limitations, faster delivery time, etc. In one embodiment, a freight service option collected by the methods and systems disclosed herein is a standing offer for 1-10 shipments but a different standing offer for 10-20 shipments from the same vendor, e.g., cheaper rates for more shipments, different weight limitations, faster delivery time, etc.

In one embodiment, a freight service option collected by the methods and systems disclosed herein is a standing offer based on the weight of mass. In one embodiment, a freight service option collected by the methods and systems disclosed herein is a standing offer for mass between 0-1,000 kg. In one embodiment, a freight service option collected by the methods and systems disclosed herein is a standing offer for mass between 1,000-5,000 kg. In one embodiment, a freight service option collected by the methods and systems disclosed herein is a standing offer for mass between 5,000-10,000 kg. In one embodiment, a freight service option collected by the methods and systems disclosed herein is a standing offer for mass between 15,000-20,000 kg. In one embodiment, a freight service option collected by the methods and systems disclosed herein is a standing offer for mass between 25,000-40,000 kg. In one embodiment, a freight service option collected by the methods and systems disclosed herein is a standing offer for mass between 5,000-40,000 kg. In one embodiment, a freight service option collected by the methods and systems disclosed herein is a standing offer for mass between 0-35,000 kg. In one embodiment, a freight service option collected by the methods and systems disclosed herein is a standing offer for mass between 500-10,000 kg. In one embodiment, a freight service option collected by the methods and systems disclosed herein is a standing offer for mass between 2,500-30,000 kg.

In one embodiment, a freight service option collected by the methods and systems disclosed herein is provided in terms of currency per unit mass, e.g., US dollars per pound, US dollars per kilogram, Euros per kilogram, Renminbis per kilogram, etc.

In one embodiment, the methods and systems disclosed herein solicit and receive standing offers from vendors, e.g., standing offers sent by email, mail, fax, phone call, etc. In one embodiment, the methods and systems disclosed herein automatically compile all standing offers. In one embodiment, the methods and systems disclosed herein curate standing offers based on a user and/or client's preference, e.g., standing offers within a price range, standing offers valid for a set period of time, standing offers for a certain amount of mass, etc.

In one embodiment, the methods and systems disclosed herein collect a freight service option in terms of LTL.

As used herein, the term "LTL", aka "less than a full truckload", refers to an offer for a portion of a container for moving mass via a truck, i.e., the full volume is not offered for moving mass. In one embodiment, a LTL is a portion of the volume of a 48 foot container. In one embodiment, a LTL is a portion of the volume of a 53 foot container.

In one embodiment, volume and weight are both important factors and are referred to as pallet position. In some embodiments, a LTL shipment may also offer additional services such as residential delivery, lift gate, freeze protection, etc.

In one embodiment, the methods and systems disclosed herein collect a freight service option in terms of FTL.

As used herein, the term "FTL", aka as full truckload, refers to an offer of a full container for moving mass via a truck. In one embodiment, a FTL is a 48 foot container. In one embodiment, a FTL is a 53 foot container. In some embodiments, a FTL shipment uses the entire space of a container and is for bulk shipments. In one embodiment, a client uses a single container for shipment. In one embodiment, a client uses more than one container for shipment. In one embodiment, a client uses a container for one type of Physical, Concrete and Tangible Object. In one embodiment, a client uses a container for more than one type of Physical, Concrete and Tangible Objects.

In one embodiment, the methods and systems disclosed herein collect a freight service option in terms of FCL.

As used herein, the term "FCL", aka full container load, refers to an offer of an entire container for moving mass. In one embodiment, a FCL is used for moving mass across water. In one embodiment, a FCL is used for moving mass across land. In one embodiment, a container sizes is 20'. In embodiment, a container size is 40'. In one embodiment a container size is 40' high cube. In one embodiment a container size is 45' high cube.

In one embodiment, the methods and systems disclosed herein collect a freight service option in terms of LCL.

As used herein, the term "LCL", aka less than a container load, refers to an offer for a portion of volume of a container for moving mass. In one embodiment, a LCL is used for moving mass across water. In one embodiment, a LCL is used for moving mass across land. In one embodiment, a LCL is provided in terms of CBM.

As used herein, the term "CBM" refers to a cubic meter. In one embodiment, a cubic meter is calculated by multiplying the length, width, and height of an object. In one embodiment, a standing offer is provided in terms of price per CBM, e.g., US dollars per CBM, Euros per CBM, etc.

As used herein, the term "normalizing the freight service option" refers to translating an offer from a vendor into a concrete representation. When the methods and systems disclosed herein collect freight service options, the freight service options may be presented in a variety of formats, languages, currencies, rates, etc. Previously, a client would have to sort through each freight service option to identify the proper information, e.g., rate, offer price, load weight limitation, transportation method, fueling costs, customs fees, availability of space, discounts, route permit, shipment fulfillment history, reviews, business history, etc., and would then have to convert and compare the freight service options in order to create an end to end freight service. The methods and systems disclosed herein convert all freight service options into a consistent format providing a user and/or client the ability to process information in an efficient manner for better decision making. In one embodiment, the methods and systems disclosed herein utilize historical data to supplement any missing information when normalizing a freight service option, e.g., dates of departure and arrival, weight limitations, deadlines, fees, etc. In one embodiment, the methods and systems disclosed herein collect any missing information from a vendor, e.g., contacting a vendor for weight limitations, price changes, fees, etc.

Without normalizing a freight service option, a client would have to acquire a number of freight service options from different vendors and manually normalize each freight service option in order to compare all the rates to create an end to end freight service. Normalizing a freight service option saves time and cost by providing an easy and efficient system for more accurately comparing freight service options and making better decisions in view of client preferences and/or requirements. In one embodiment, normalizing a freight service option provides a user and/or client with the ability to filter and search results from a standard readable data set.

FIG. 2 is an illustrative example of collecting freight service options from Vendor 201, 202, 203, and 204 and normalizing those freight service options into standard readable data sets and presenting the standard readable data set to a user and/or client. In this example, the methods and systems disclosed here collect freight service options in real time.

In one embodiment, the methods and systems disclosed herein automatically normalize a freight service option. In one embodiment, normalizing a freight service option does not change the concrete representation of a freight service option, i.e., the freight service option is already in a standard readable data set. In one embodiment, a user and/or client selects a requirement for normalization, e.g., the language, the currency, the visual arrangement, etc., of a concrete representation. In one embodiment, the methods and systems disclosed herein prompt a user and/or client for a client's preference, e.g., a selection of a language, a selection of a currency, a selection of a specific format, etc.

In one embodiment, normalizing a freight service option comprises presenting all freight service options in US dollars. In one embodiment, normalizing a freight service option comprises presenting all freight service options in Euros. In one embodiment, normalizing a freight service option comprises presenting all data in a single axis. In one embodiment, normalizing a freight service option comprises presenting the freight service option in English. In one embodiment, normalizing a freight service option comprises presenting the freight service option in Spanish. In one embodiment, normalizing a freight service option comprises presenting the freight service option in Chinese. In one embodiment, normalizing a freight service option comprises presenting the freight service option in Dutch.

As used herein, the term "standard readable data set" refers to a collection of information that is organized in consistent units or criteria, allowing for comparing different items according to the same variable or variables. Vendors send freight service options in a number of different formats, structures, languages, etc. In one embodiment, normalizing a freight service option into a standard readable data set provides a convenient format for comparing information without having to manually translate each freight service option separately on a case by case basis. In one embodiment, a standard readable data set is presented within a chart for comparing freight service options. In one embodiment, a standard readable data set is presented on a single axis. In one embodiment, a standard readable data set is presented in English. In one embodiment, a standard readable data set is presented in Dutch. In one embodiment, a standard readable data is presented in US dollars. In one embodiment, mass, length, and volume are presented in the imperial measurement system, e.g., pounds, inches, feet, gallons, etc. In one embodiment, mass, length, and volume are presented in the metric system, e.g., grams, meters, etc.

In one embodiment, the methods and systems disclosed herein automatically normalize freight service options into a standard readable data set, e.g., changing the concrete representation of a freight service option upon receipt, comparing the concrete representation of a freight service option with a client's preference, evaluating a freight service option according to a requirement, etc. In one embodiment, a user and/or client selects a requirement for presenting a standard readable data set, e.g., the language, the currency, the format, etc. In one embodiment, the methods and systems disclosed herein prompt a user for a client's preference, e.g., the language, the currency, the format, etc.

As used herein, the term "route configuration" refers to the path mass travels based on the beginning physical geographic location of the mass and the final physical geographic location of the mass. In one embodiment, a client and/or user selects a route configuration, and the methods and systems disclosed herein compile freight service options compatible with the selected route, e.g., selecting freight service options based on the method of transportation, utilizing historical data of previous transactions with vendors, providing recommendations of vendors, etc. In one embodiment, the beginning location is Amsterdam and the final location is China. In one embodiment, the beginning location is Paris and the final location is Los Angeles, Calif.

As used herein, the term "acquiring a route configuration" refers to collecting a beginning physical geographic location of mass and a final physical geographic location of the mass. In one embodiment, the methods and systems disclosed herein automatically receive a route configuration, e.g., sharing information with a Cloud database, transferring information with an application interface program, etc. In one embodiment, acquiring a route configuration comprises prompting a client and/or user for the beginning and/or final location of mass. In one embodiment, acquiring a route configuration comprises a user and/or client interacting with a Physical, Tangible Display Means, e.g., operating a graphical user interface, manipulating a concrete representation of a route, selecting options from a drop down menu, etc. In one embodiment, acquiring a route configuration is a requirement for a user and/or client to operate the methods and systems disclosed herein. In one embodiment, the methods and systems disclosed herein acquire more than two route configurations.

As used herein, the term "analyzing the route configuration" refers to comparing the freight service options to a route configuration and determining the most relevant freight service options for moving mass. In one embodiment, analyzing a route configuration comprises eliminating freight service options that are not compatible with a route configuration. In one embodiment, analyzing a route configuration comprises determining the freight service options compatible with a route configuration for moving mass. In one embodiment, analyzing a route configuration comprises ranking freight service options for moving mass in accordance with a route configuration. In one embodiment, analyzing a route configuration comprises utilizing historical data, e.g., selecting preferred vendors, choosing preferred methods of transportation, placing emphasis on quality of service over cost, not selecting previous vendors with a history of not fulfilling shipments, etc. In one embodiment, the methods and systems disclosed herein prompt a user and/or client for a client's preference, e.g., a price range, a range of dates, preference of transportation, etc. In one embodiment, the methods and systems disclosed herein prompt a user and/or client for a requirement, e.g., selection of a freight service option, selection of a date of arrival, selection of a price range, etc.

In some embodiments, multiple freight service options are available based on a particular route configuration. In one example, multiple freight service options are available based the date of arrival. In one example, one or more services options are available, e.g., a truck and a plane can deliver on the same day at different prices and at different times. In one embodiment, the methods and systems disclosed herein provide recommendations to a client and/or user for selection of freight services. In one embodiment, recommendations are based on quality of service, e.g., history of shipping fulfillment, reviews, goodwill of vendor, etc. In one embodiment, recommendations are based on the most cost effective method, e.g., fastest day of arrival versus cost, arriving at a later day for a lower fee, best price based on weight, etc.

As used herein, the term "generating a list of relevant options" refers to compiling the freight service options available for moving the mass based on the route configuration. In one embodiment, not all freight service options are compatible for moving mass. In one embodiment, some vendors may not offer services to a desired location. In one embodiment, some vendors may not offer services compatible with delivery, e.g., needing to deliver by ship versus by truck, not arriving on a desired date, etc. In one embodiment, assessing information and eliminating unavailable choices saves time and effort by not having to manually evaluate each option on a case by case basis. In one embodiment, generating a list of relevant options is comprises utilizing historical data, e.g., a vendor's record of completed deliveries, previous transactions between a client and vendor, predicting trends for moving more mass than originally anticipated, etc. In one embodiment, generating a list of relevant options is accomplished without any restriction, i.e., compiling all the possible combinations of freight service options for moving mass. In one embodiment, generating a list of relevant options is restricted by a user and/or client preference, e.g., arrival date of mass, a price range, preferred vendors, preferred transportation method, etc.

As used herein, the term "presenting the list of relevant options on a Physical, Tangible Display Means" refers to displaying the combination of freight service options as a concrete representation. In one embodiment, presenting the list of relevant options on a Physical, Tangible Display Means comprises displaying a concrete representation on a screen. In one embodiment, presenting the list of relevant options on a Physical, Tangible Display Means comprises displaying a concrete representation on a computer. In one embodiment, presenting the list of relevant options on a Physical, Tangible Display Means comprises displaying a concrete representation on a mobile device. In one embodiment, presenting a list of relevant options on a Physical, Tangible Display Means comprises a directional graph.

As used herein, the term "directional graph" refers to a visual representation of vertices connected by edges, where the edges have a direction associated with them. In one embodiment, a directional graph comprises arrows. In one embodiment, a directional graph comprises an axis, e.g., x, y, and z coordinates. In one embodiment, a directional graph comprises representations of measurements, e.g., distance, velocity, time, etc. In one embodiment, a directional graph provides a visual representation of the movement of mass. In one embodiment, a directional graph is presented on a graphical user interface. In one embodiment, a directional graph comprises graphics, e.g., icons and symbols representing an airplane, ship, truck, and/or train. In one embodiment, a directional graph comprises representations of motion, e.g., a truck moving from one path to another through the use of arrows and dotted lines. In one embodiment, the systems and methods disclosed herein automatically generate a directional graph. In one embodiment, a user and/or client of the methods and systems disclosed herein inputs data, e.g., a user selects a destination and the directional graph generates a new representation. In one embodiment, the methods and systems disclosed herein prompt a user to input data, e.g., confirmation of a changed destination.

In one embodiment, presenting a list of relevant options on a Physical, Tangible Display Means comprises displaying information within a hub and spoke configuration.

As used herein, the term "hub and spoke configuration" refers to a diagram using a center through which traffic passes. In one embodiment, a hub represents a rendezvous point where mass is loaded and unloaded. In one embodiment, there are more than two hubs. In one embodiment, spokes represent freight services either coming from an origin or going towards a destination.

FIG. 1A is an illustrative example of a hub and spoke configuration. Mass is moved from Origin 101 and Origin 102 to Rendezvous Point 103. The mass is then moved to Rendezvous Point 104 where mass is distributed to Destination 105 and Destination 106. Route Configuration Menu 107 provides a collection of Origin and Destinations while Transit Service Menu 108 provides a collection of Freight Service Options.

In one embodiment of a hub and spoke configuration, the hub represents a distribution center. If the movement of mass requires distribution across several different geographic locations, then utilizing a hub representing a distribution center serves as a way to efficiently manage shipments for coordinating the movement of mass. Conversely, if the movement of mass requires moving mass from multiple locations to a single location, then a rendezvous point serves as a point where all freight services can meet.

Figure 1B:
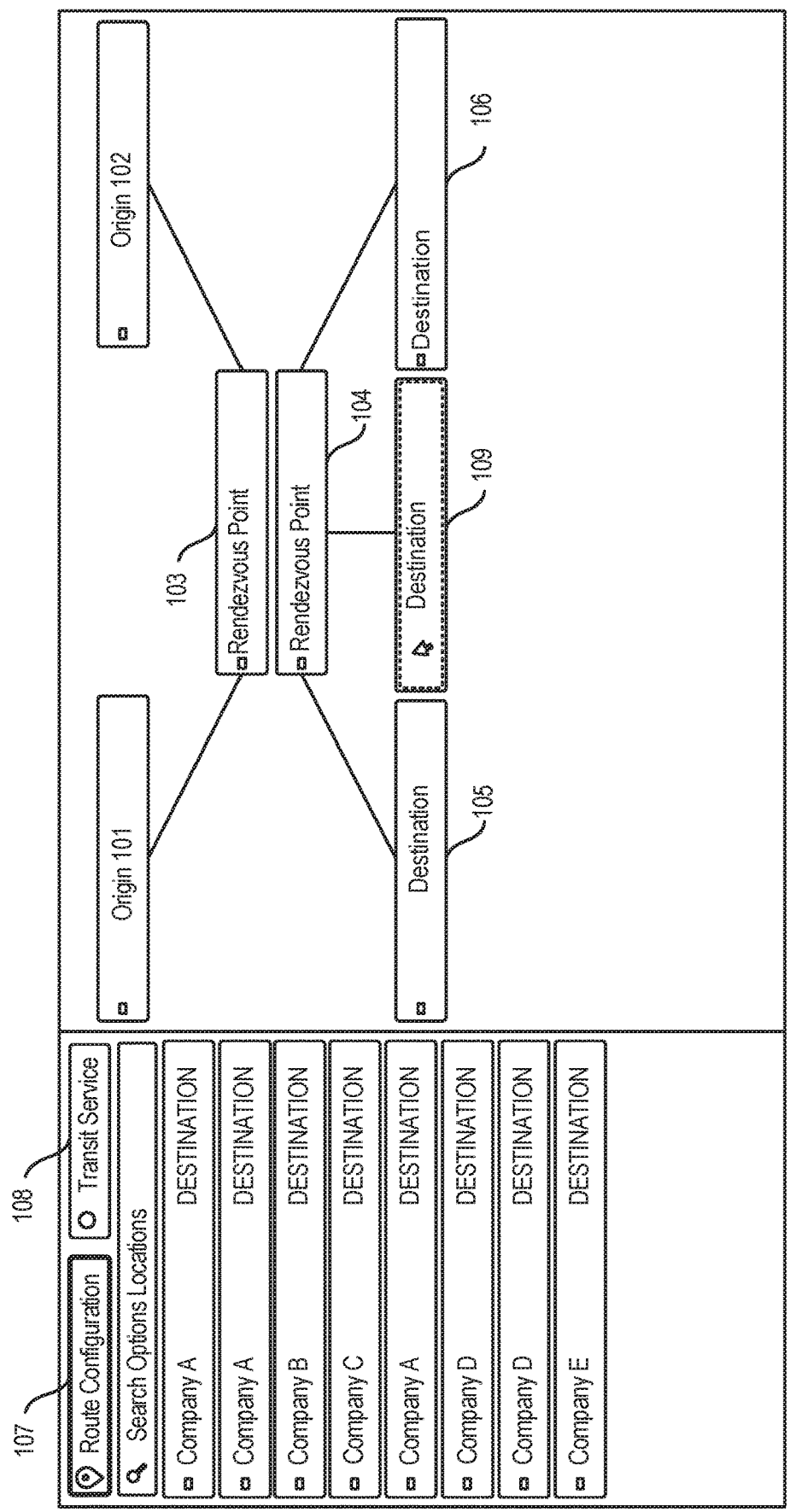
FIG. 1B is an illustrative example of how new Destination 109 may be added with a drag and drop function.

FIG. 1B is an illustrative example of how new Destination 109 may be added with a drag and drop function. Illustrating how multiple locations for moving mass to and from can be managed with the methods and systems disclosed herein.

In one embodiment, a hub represents a rendezvous point.

As used herein, the term "rendezvous point" refers to a physical geographic location where mass is transferred from one freight service to another. When two or more freight services are required, a rendezvous point provides a location for facilitating the transfer of mass from one freight service to another. In one example, a ship moves mass to a port where a truck takes the mass to another location. In another example, a truck transports mass to an airport and an airplane takes the mass to another location. In one embodiment, the rendezvous point is a port. In one embodiment, the rendezvous point is an airport. In one embodiment, the rendezvous point is a factory.

In one embodiment, a rendezvous point is the location where mass is transferred from one freight service to another. In one embodiment, a single vendor is responsible for moving mass and uses two methods of transportation, e.g., a plane and truck. In one embodiment, multiple vendors are used, e.g., one vendor provides movement with a truck and another vendor provides movement by a ship.

In one embodiment, more than two rendezvous points are required for moving mass from one location to another location. In one embodiment, some routes are more difficult than others based on geography, customs laws, trading regulations, availability of freight services, etc. Such routes may require more complex routes than others requiring the use of multiple freight services with multiple rendezvous points.

In one embodiment, methods and systems disclosed herein comprise a user and/or client selecting vendors for unloading and loading mass. In one embodiment, a truck moves mass to a port where the mass is removed from the truck and placed onto a ship. In one embodiment, an airplane lands at an airport with mass and the mass is removed from the airplane and placed into another airplane. In one embodiment, no unloading or loading services are required. In one example, a truck carrying mass is carried across water by a ferry and continues movement of the mass by roads. In one embodiment, the methods and systems disclosed herein automatically select the unloading and loading vendors. In one embodiment, the methods and systems disclosed herein prompt a user and/or client to select unloading and loading vendors.

In one embodiment of a hub and spoke configuration, the spokes represent a path mass moves along. In one embodiment of a hub and spoke configuration, one set of spokes represents the origin and another set of spokes represents the destination.

As used herein, the term "origin" refers to the beginning physical geographic location of mass, e.g., GPS coordinates, cross-streets, addresses, buildings, etc. In one embodiment, the methods and systems disclosed herein comprise more than two origins. In one embodiment, the mass may travel across several locations before arriving at its final location, i.e., the end of the route configuration. In one embodiment, mass from different origins arrives at the same destination.

As used herein, the term "destination" refers to the physical geographic location of mass after a segment of movement, e.g., GPS coordinates, cross-streets, addresses, buildings, etc. In one embodiment, a destination is not necessarily the final location, i.e., the end of the route configuration. In one embodiment, the final destination is the end of the route configuration. In one embodiment, the methods and systems disclosed herein comprise mass moving across several locations and rendezvous points before arriving at the end of the route. In one embodiment, a destination may become an origin in subsequent segments of movement. In one example, mass originating from Los Angeles, arrives at an airport in London, and goes through a port in Singapore, wherein London becomes an origin. In one embodiment, the methods and systems disclosed herein comprise multiple destinations.

In one embodiment, the Physical, Tangible Display Means comprises a drag and drop function.

As used herein, the term "drag and drop function" refers to the action of moving icons, symbols, menus, etc., from one stationary location to another stationary location on a concrete representation with degrees of freedom. In one embodiment, a drag and drop function allows a user and/or client to move icons, symbols, menus, etc., within a two dimensional plane without limitation. In one embodiment, a drag and drop function allows a user and/or client to efficiently select and create a route configuration for moving mass. In one embodiment, a drag and drop function allows a user and/or client to efficiently manipulate concrete representations.

Figure 1C:
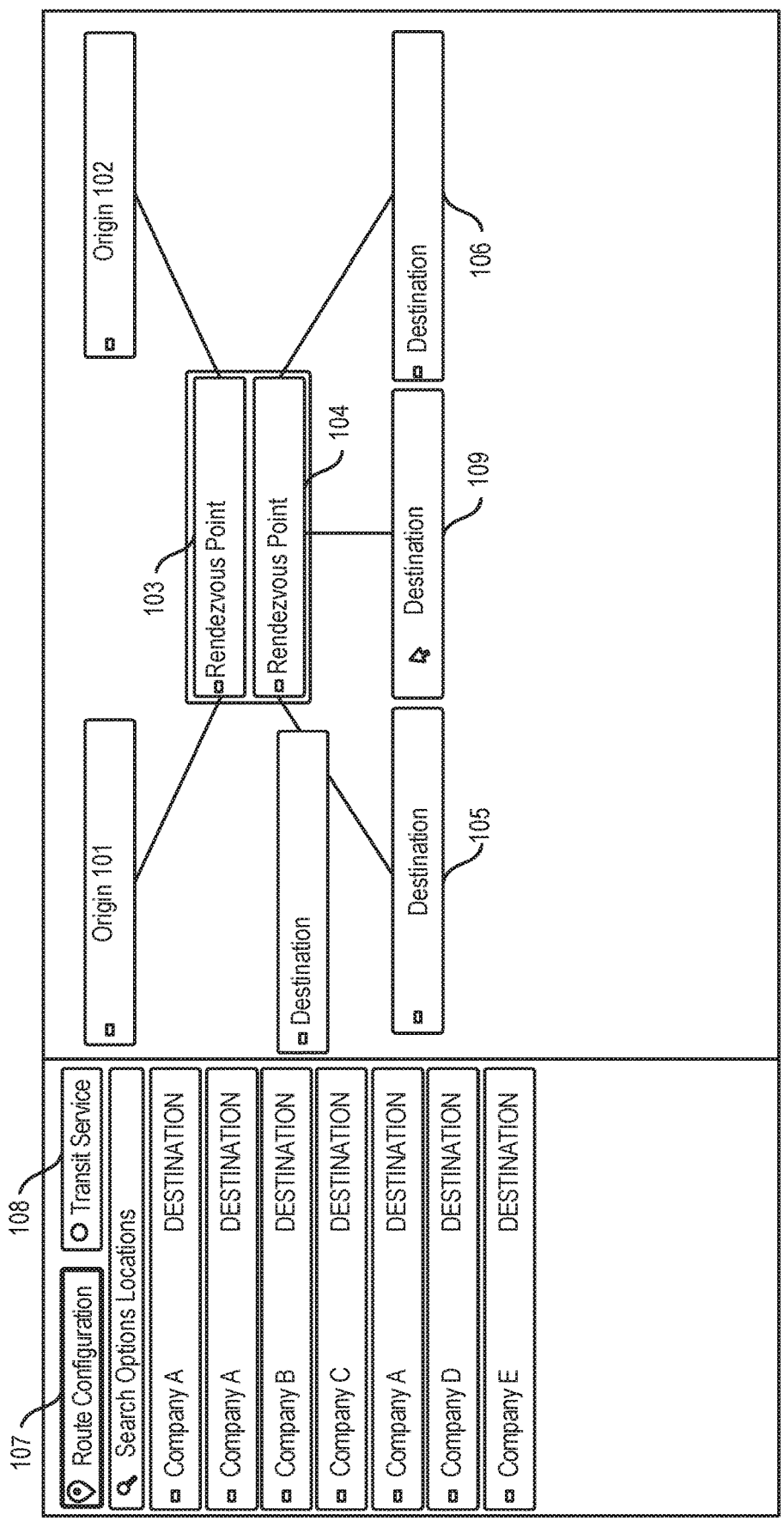
FIG. 1C is an illustrative example of how new Destination 109 may be added to the hub and spoke configuration with drag and drop function from Route Configuration Menu 107.

FIG. 1C is an illustrative example of how new Destination 109 may be added to the hub and spoke configuration with drag and drop function from Route Configuration Menu 107.

Figure 1D:
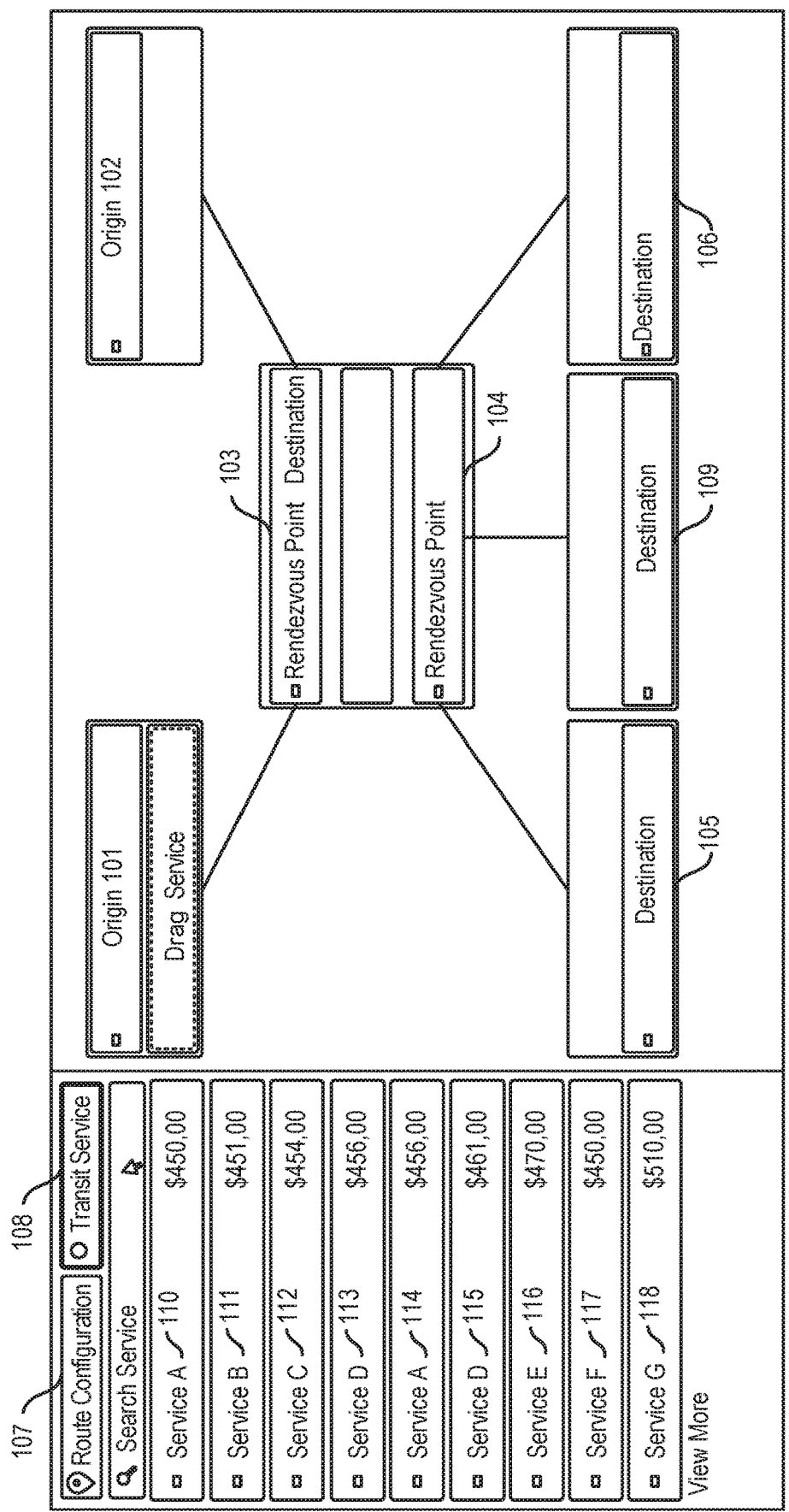
FIG. 1D is an illustrative example of how Freight Service 110, Freight Service 111, Freight Service 112, Freight Service 113, Freight Service 114, Freight Service 115, Freight Service 116, Freight Service 117, and Freight Service 118 can be selected from Transit Service Menu 108 and inserted into the hub and spoke configuration with a drag and drop function.

FIG. 1D is an illustrative example of how Freight Service 110, Freight Service 111, Freight Service 112, Freight Service 113, Freight Service 114, Freight Service 115, Freight Service 116, Freight Service 117, and Freight Service 118 can be selected from Transit Service Menu 108 and inserted into the hub and spoke configuration with a drag and drop function.

Figure 1E:
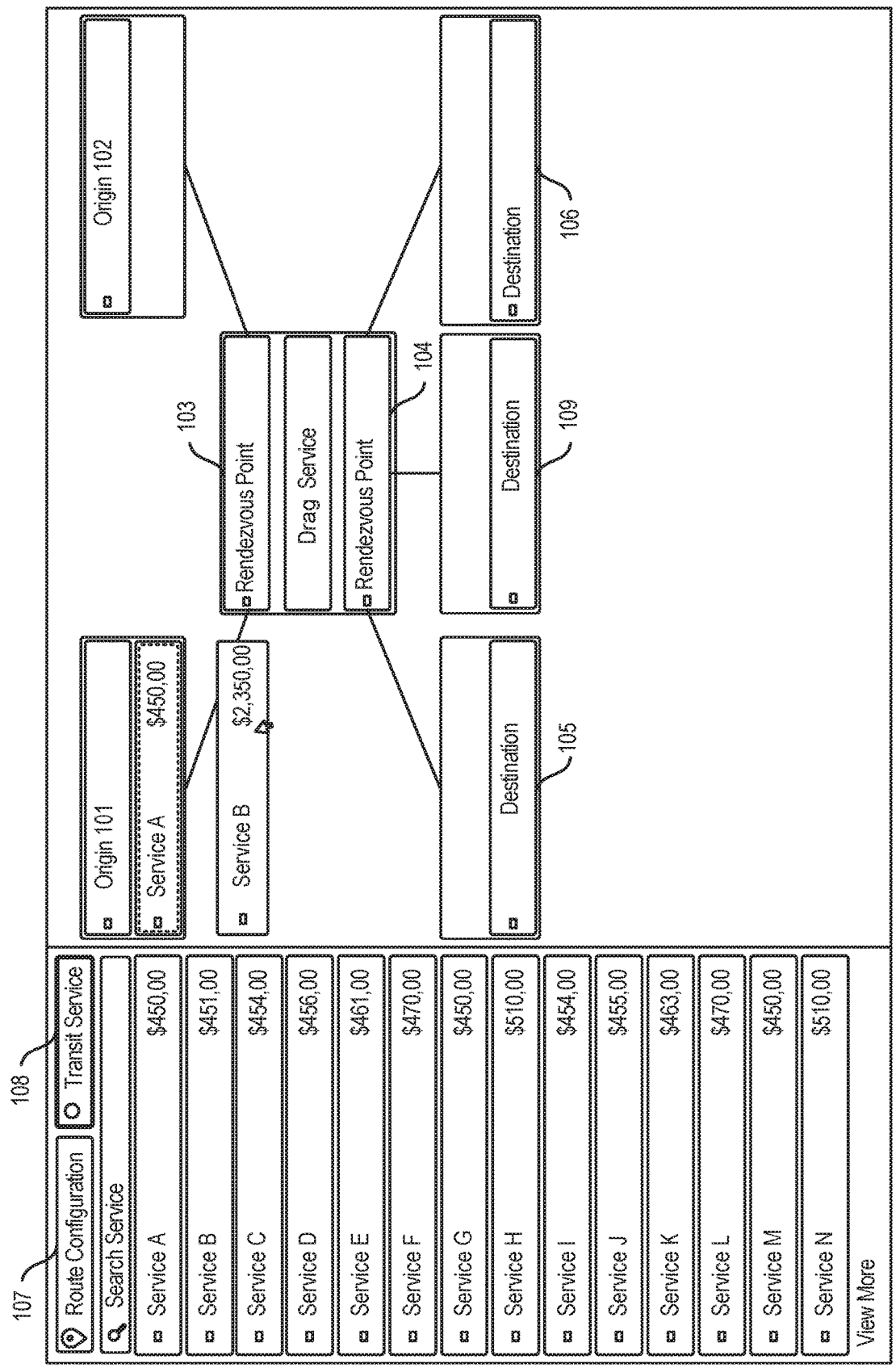
FIG. 1E is an illustrative example of how Freight Service 110 is selected from Transit Service Menu 108 and inserted into the hub and spoke configuration with a drag and drop function.

FIG. 1E is an illustrative example of how Freight Service 110 is selected from Transit Service Menu 108 and inserted into the hub and spoke configuration with a drag and drop function.

Figure 3:
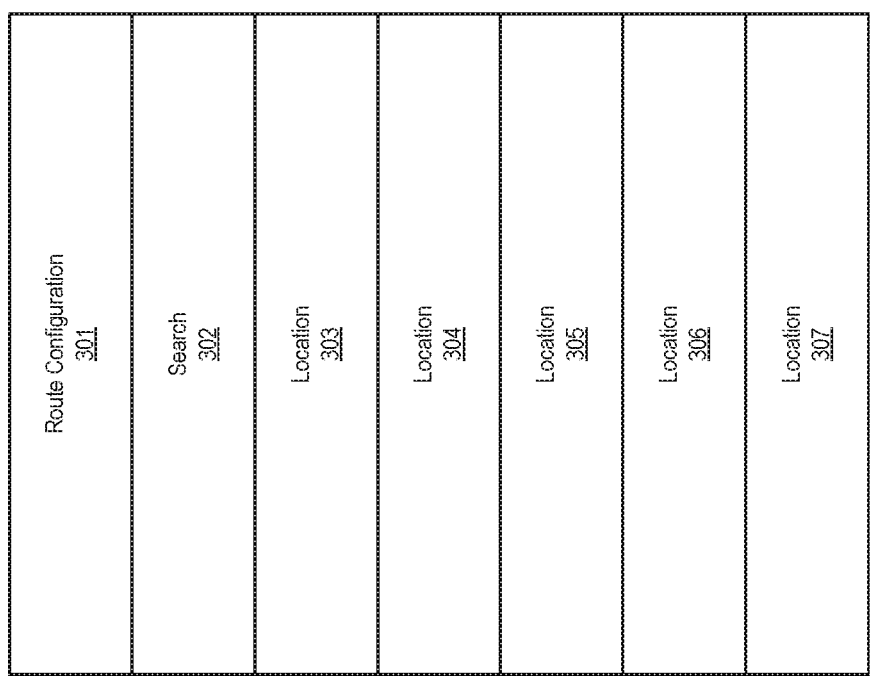
FIG. 3 is an illustrative example of a route configuration menu for creating Route Configuration 301 with Search function 302 listing Location 303, Location 304, Location 305, Location 306, and Location 307.

In one embodiment, a route configuration menu provides a list of origins and destinations that can be dragged and dropped into a hub and spoke configuration. In one embodiment, FIG. 3 is an illustrative example of a route configuration menu for creating Route Configuration 301 with Search function 302 listing Location 303, Location 304, Location 305, Location 306, and Location 307. In one embodiment, a drag and drop function enables a user and/or client to quickly and efficiently create a concrete representation of an end to end freight service. The concrete representation provides a visual representation of how the movement of mass will occur and allows a user and/or client to choose different options freely and easily through the drag and drop function.

In one embodiment, a drag and drop function allows a user to configure a route and select freight services easily and efficiently. In one embodiment, a hub and spoke configuration provides a concrete representation of how the movement of mass would proceed and the drag and drop functions allows for easy manipulation by the user and/or client.

In one embodiment, the methods and systems disclosed herein allows a client to select freight services from a collection of freight service options. In one embodiment, the methods and systems disclosed herein allows a client to compare logistical information, e.g., price, arrival of destination, transportation method, etc. In one embodiment, normalizing freight service options allows a client to easily compare logistical information between different freight services and make an informed decision about which freight service to use. In one embodiment, the methods and systems disclosed herein allow a user and/or client to sort freight service options based on a client's preference and/or requirements, e.g., weight limitations, choice of vendor, price point, etc. In one embodiment, the methods and systems disclosed herein allow a user and/or client to eliminate freight service options, e.g., cost, time in transit, a vendor's historical fulfillment of shipments, etc.

In one embodiment, the methods and systems disclosed herein comprise an all-in rate.

As used herein, the term "all-in rate" refers to the total cost for the end to end freight service. In one embodiment, paying an all-in rate saves time by paying a lump sum as opposed to paying each individual vendor separately. In one embodiment, paying an all-in rate also prevents any missed payments that may stall delivery. In one embodiment, the methods and systems disclosed herein automatically pay an all-in-rate, e.g., using stored credit information, a user and/or client setting up an automatic payment plan, connecting a credit card, bank, payment gateway, etc. In one embodiment, the methods and systems disclosed herein encrypt payment information. In one embodiment, a user and/or client may review the individual costs of an all-in rate. In one embodiment, normalizing an all-in rate allows a client and/or user to evaluate an end to end freight service by the individual costs making an all-in rate.

In one embodiment, the methods disclosed herein comprise selecting an end to end freight service.

As used herein, the term "selecting an end to end freight service" refers to choosing a progression of activities for facilitating the movement of mass from one location to another. In one embodiment, selecting an end to end freight service comprises selecting at least one origin and at least one destination. In one embodiment, selecting an end to end freight service comprises selecting a path for moving mass. In one embodiment, selecting an end to end freight service comprises moving mass from an origin to a destination through a rendezvous point. In one embodiment, selecting an end to end freight service comprises moving mass from two or more origins to two or more destinations through one or more rendezvous points. In one embodiment, the methods and systems disclosed herein automatically select an end to end freight service, e.g., selecting an end to end freight service based on a client's preference, selecting an end to end freight service based on a requirement, selecting an end to end freight service based on a cycle, e.g., moving mass on a weekly basis through the same end to end freight service, etc. In one embodiment, selecting an end to end freight service comprises selecting freight service options from a transit service menu. In one embodiment, a client selects a new route from which a new list of relevant options is generated and chosen from.

FIG. 1A is an illustrative example how a client and/or user may select a number of origins and destinations for moving mass. In this example, mass is moved from Origin 101 and Origin 102 to Rendezvous Point 103. The mass is then moved to Rendezvous Point 104 where mass is distributed to Destination 105 and Destination 106. Route Configuration Menu 107 provides a collection of Origin and Destinations while Transit Service Menu 108 provides a collection of Freight Service Options.

FIG. 1C is an illustrative example of how new Destination 109 or any number of origins and/or destinations may be added to the hub and spoke configuration with a drag and drop function from Route Configuration Menu 107.

In one embodiment, the methods and systems disclosed herein comprise acquiring payment information.

As used herein, the term "acquiring payment information" refers to collecting one or more of an account number, bank routing number, credit/debit card number, check, etc., required for paying vendors providing services. In one embodiment, acquiring payment information comprises prompting a user and/or client to input information, e.g., utilizing a keyboard, sending a check, using a phone, etc. In one embodiment, acquiring payment information comprises an initial coin offering. In one embodiment, acquiring payment information comprises encrypting information such that third parties with unwarranted access may not possess payment information.

In one embodiment, the methods and systems disclosed herein comprise storing payment information.

As used herein the term "storing payment information" refers to documenting an account number, bank routing number, credit/debit card number, check, etc. In one embodiment, storing payment information allows a client to pay vendors quickly without having to re-enter payment information for subsequent purchases of services, i.e., automating payments. In one embodiment, storing payment information includes encrypting the payment information. In one embodiment, storing payment information comprises a third party documenting the information.

Disclosed herein is an end to end freight service quote system, comprising:
 a Physical, Tangible Display Means;
 a Freight Service Option Depository;
 a Normalization Converter; and
 a Database of Relevant Freight Service Options.

As used herein, the term "Freight Service Option Depository" refers to a collection of offers in their original format from vendors. In one embodiment, a service option depository is a database. In one embodiment, service options are sent via mail, email, fax, etc., at which point the freight service options are manually entered onto a computer. In one embodiment, freight service options are automatically stored within a database. In one embodiment, physical copies of freight service options are kept in a storage container.

As used herein, the term "Normalization Converter" refers to a means for transforming a freight service option into a standard readable data set. In one embodiment, a Normalization Converter comprises an algorithm running on a computer program. In one embodiment, a Normalization Converter translates a freight service option manually. In one embodiment, a Normalization Converter translates all currency values into US dollars. In one embodiment, a Normalization Converter translates all languages into English. In one embodiment, the Normalization Converter translates all languages into Dutch. In one embodiment, a Normalization Converter does transform a freight service option, i.e., the freight service option was already in a standard readable data set. In one embodiment, a Normalization Converter translates all measurements into the imperial system, e.g., pounds, feet, inches, etc. In one embodiment, a Normalization Converter translates all measurements into the metric system, e.g., meters, grams, kilograms, etc. In one embodiment, a Normalization Converter converts all units of time into the same unit, e.g., presenting units of time in seconds, minutes, hours, days, weeks, months, years, etc.

As used herein, the term "Database of Relevant Freight Service Options" refers to a collection of offers from vendors stored in a normalized standard readable data set. In one embodiment, the Database of Relevant Freight Service Options is stored in a digital storage means. In one embodiment, the Database of Relevant Freight Service Options are stored in a physical format, e.g., paper, faxes, etc.

In one embodiment, the methods and systems disclosed herein comprise a route configuration menu.

As used herein, the term "route configuration menu" refers to a list with a collection of geographic locations that a client and/or user can choose for defining a route configuration. In one embodiment, selecting a route from the route configuration menu provides a list of relevant options compatible with the selected route. In one embodiment, a route configuration menu comprises a drag and drop function allowing a user and/or client to create a concrete representation of a route configuration. In one embodiment, selecting a new route generates a new list of relevant options. In one embodiment, the route configuration menu is on a single axis listing physical geographic locations.

FIG. 3 is an illustrative example of a route configuration menu for creating Route Configuration 301 with Search function 302 listing Location 303, Location 304, Location 305, Location 306, and Location 307. In one embodiment, the locations are based historical data, e.g., previous origins and destinations selected for a shipment. In one embodiment, a client and/or user selects a new location.

Within the context of this disclosure, a single axis refers to the spatial orientation, wherein the route configuration menu is presented in an up and down format on a Physical, Tangible Display Means. In one embodiment, the route configuration menu is organized by country. In one embodiment, the route configuration menu is organized by city. In one embodiment, the route configuration menu is listed by address. In some embodiments, the route configuration menu stores routes from previous shipments. In some embodiments, new geographic locations are entered in manually. In some embodiments, the locations are dragged from the menu and onto a diagram presented on a graphical user interface. FIG. 3 is an illustrative example of a list of locations may be selected.

In one embodiment, the methods and systems disclosed herein comprise a transit service menu.

As used herein, the term "transit service menu" refers to a list of freight services options capable of moving mass based on a route configuration. In one embodiment, a transit service menu is automatically generated after selecting the route configuration, e.g., utilizing historical data of previous shipments to present previously used freight service options, comparing the route configuration with the Freight Service Option Depository, selecting new freight service options, etc. In one embodiment, a transit service menu is a single axis listing freight services accommodating the movement of mass. In one embodiment, a transit service menu provides all the possible combination of freight services for moving mass. In one embodiment, selecting a first freight service will eliminate one or more other freight services for a number of reasons. In one example, after selecting a first freight service, other freight services may not be available for one or more reasons, e.g., not meeting a requirement (date of delivery) or a client's preference (price range). In another example, after selecting a first freight service, other freight services may not be available to meet at the rendezvous point. In one embodiment, the locations are dragged and dropped from the transit service menu and onto a diagram presented on a graphical user interface.

Figure 4:
FIG. 4 is an illustrative example of a transit service menu for selecting Transit Service 401 with Search function 402 listing Freight Service 403, Freight Service 404, Freight Service 405, Freight Service 406, and Freight Service 407.

FIG. 4 is an illustrative example of a transit service menu for selecting Transit Service 401 with Search function 402 listing Freight Service 403, Freight Service 404, Freight Service 405, Freight Service 406, and Freight Service 407. In one embodiment, a user and/or client selects a freight service based on previous use. In one embodiment, a user and/or client searches for a new freight service.

In one embodiment, the methods and systems disclosed herein comprise a rendezvous point. In one embodiment, the rendezvous point serves as a meeting point between freight services. In one embodiment, the rendezvous point is a port. In one embodiment, the rendezvous point is an airport. In one embodiment, a ship transports mass to a port (the rendezvous point) where a truck continues movement on land. In one embodiment, a truck delivers mass to an airport (the rendezvous point) where an airplane continues movement of the mass, e.g., via a segment of air travel.

In one embodiment, the methods and systems disclosed herein comprise a means for unloading cargo. In one embodiment, the methods and systems disclosed herein comprise a means for loading cargo.

In one embodiment, the methods and systems disclosed herein comprise one freight service resuming the movement of mass on behalf of another freight service, e.g., a freight service runs out of fuel, a vehicle becomes damaged, etc. In those instances, unloading and loading cargo is required to continue movement. In one embodiment, mass is unloaded from a truck and loaded onto an airplane. In one embodiment, cargo is unloaded from a ship and loaded onto a truck. In one embodiment, the methods and systems disclosed herein automatically select a new freight service for continuing the movement of mass, e.g., utilizing historical data for selecting a reliable and/or available freight service, selecting a freight service based on a client's preference and/or requirement, etc. In one embodiment, the methods and systems disclosed herein prompt a user and/or client for an action, e.g., delaying the movement of mass, selecting a new freight service, cancelling a freight service, etc.

In one embodiment, the methods and systems disclosed herein comprise a ship.

As used herein, the term "ship" refers to a seaworthy vessel traveling across water and is capable of moving mass. In one embodiment, the ship moves mass from one location to another. In one embodiment, the methods and systems disclosed herein recommend a ship for the movement of mass. In one embodiment, the methods and systems disclosed herein select a ship for the movement of mass.

In one embodiment, the methods and systems disclosed herein comprise an airplane.

As used herein, the term "airplane" refers to a vessel traveling through the air and is capable of moving mass. In one embodiment, the airplane moves mass from one location to another. In one embodiment, the methods and systems disclosed herein recommend an airplane for the movement of mass. In one embodiment, the methods and systems disclosed herein select an airplane for the movement of mass.

In one embodiment, the methods and systems disclosed herein comprise a truck.

As used herein, the term "truck" refers to a vessel traveling by ground and is capable of moving mass. In one embodiment, the truck moves mass from one location to another. In one embodiment, the methods and systems disclosed herein recommend a truck for the movement of mass. In one embodiment, the methods and systems disclosed herein select a truck for the movement of mass.

In one embodiment, the methods and systems disclosed herein comprise a train.

As used herein, the term "train" refers to a vessel traveling by railroad tracks and is capable of moving mass. In one embodiment, the train moves mass from one location to another. In one embodiment, the methods and systems disclosed herein recommend a train for the movement of mass. In one embodiment, the methods and systems disclosed herein select a train for the movement of mass.

Although the present invention herein has been described with reference to various exemplary embodiments, it is to be understood that these embodiments are merely illustrative of the principles and applications of the present invention. Those having skill in the art would recognize that various modifications to the exemplary embodiments may be made, without departing from the scope of the invention.

Moreover, it should be understood that various features and/or characteristics of differing embodiments herein may be combined with one another. It is therefore to be understood that numerous modifications may be made to the illustrative embodiments and that other arrangements may be devised without departing from the scope of the invention.

Furthermore, other embodiments of the invention will be apparent to those skilled in the art from consideration of the specification and practice of the invention disclosed herein. It is intended that the specification and examples be considered as exemplary only, with a scope and spirit being indicated by the claims.

Finally, it is noted that, as used in this specification and the appended claims, the singular forms "a," "an," and "the," include plural referents unless expressly and unequivocally limited to one referent, and vice versa. As used herein, the term "include" or "comprising" and its grammatical variants are intended to be non-limiting, such that recitation of an item or items is not to the exclusion of other like items that can be substituted or added to the recited item(s).

What is claimed is:

1. A method comprising:
   receiving, from one or more vendors, freight service data representing freight service options representing freight delivery offers, and storing the freight service data in a database;

based on data representing a route configuration, generating a list of freight service options that comprises one or more freight service options, from a set of one or more freight service options based on the freight service data, that satisfy one or more requirements of the route configuration;

wherein the route configuration comprises at least a beginning geographical location and a destination geographical location for freight shipping;

automatically generating graphical user interface data that, when processed by a computing device, causes display of a graphical user interface;

causing the graphical user interface data to be transmitted to a client computing device;

wherein the graphical user interface comprises:
the list of freight service options,
a route configuration diagram comprising one or more visual nodes corresponding to one or more geographical locations, and
a service option interactive list comprising visual representations of freight service options of the list of freight service options, wherein each visual representation of the service option interactive list (a) represents a transportation option for shipping the freight from a geographic location, and (b) is movable to a corresponding visual node on the route configuration diagram;

receiving drag and drop user input data, via the graphical user interface, to move a particular visual representation of the service option interactive list to a particular visual node on the route configuration diagram, whereby a particular freight service option, represented by the particular visual representation, is associated with a particular geographical location represented by the particular visual node;

based on the particular freight service option being associated with the particular geographical location in the route configuration diagram, generating a freight shipping plan to ship freight between the beginning geographical location and the destination geographical location;

wherein the freight shipping plan comprises executing the particular freight service option at the particular geographical location;

wherein the method is performed by one or more computing devices.

2. The method of claim 1, further comprising:
wherein the graphical user interface comprises a plurality of geographic locations comprising the beginning geographical location and the destination geographical location;
receiving user input route configuration data, via the graphical user interface, that indicates the route configuration.

3. The method of claim 1, wherein:
the graphical user interface comprises:
a geographical interactive list of visual representations of geographical locations that comprises the beginning geographical location and the destination geographical location,
the graphical user interface is configured for user interaction with the route configuration diagram comprising one or more of:
removing a first geographical location from the route configuration diagram by removing a visual node, of the one or more visual nodes, that represents the first geographical location, or
adding a second geographical location to the route configuration diagram by moving a visual representation of the second geographical location from the geographical interactive list to the route configuration diagram to create a new visual node in the route configuration diagram.

4. The method of claim 1, further comprising:
automatically generating, using the freight service data in the database, the set of one or more freight service options, each freight service option in the set of one or more freight service options being represented according to a standard format.

5. The method of claim 4, further comprising:
collecting data related to historical freight shipping options;
generating standard data representing the collected data related to historical freight shipping options; and
adding the generated standard data to the set of one or more freight service options.

6. The method of claim 4, wherein the freight service data represents two or more freight service options and the two or more options are presented in different formats when received from the one or more vendors; and wherein the standard format is based on user preference data.

7. The method of claim 1, wherein the route configuration further comprises at least one rendezvous point geographical location, the rendezvous point geographical location representing a location for freight shipping between the beginning geographical location and the destination geographical location.

8. The method of claim 1, further comprising:
receiving user preference data that indicates one or more of:
a price range of freight service options,
time in transit,
a range of dates of arrival,
method of transportation,
previous transactions with vendors,
history of completion of service of vendors,
one or more vendor recommendations, or
selection of a freight service option for a portion of the route configuration;
based, at least in part, on the user preference data, eliminating, from the list of freight service options, particular one or more freight service options.

9. The method of claim 1, further comprising:
receiving, from a user, a sorting metric that indicates one or more of:
fastest method of movement,
weight limitations,
choice of vendor,
cost effectiveness,
quality of service, or
history of completion of service;
sorting the list of freight service options by at least the sorting metric.

10. A system comprising a computer device that is configured to perform:
receiving, from one or more vendors, freight service data representing freight service options representing freight delivery offers, and storing the freight service data in a database;
based on data representing a route configuration, generating a list of freight service options that comprises one or more freight service options, from a set of one or more freight service options based on the freight service data, that satisfy one or more requirements of the route configuration;
wherein the route configuration comprises at least a beginning geographical location and a destination geographical location for freight shipping;
automatically generating graphical user interface data that, when processed by a computing device, causes display of a graphical user interface;
causing the graphical user interface data to be transmitted to a client computing device;
wherein the graphical user interface comprises:
the list of freight service options,
a route configuration diagram comprising one or more visual nodes corresponding to one or more geographical locations, and
a service option interactive list comprising visual representations of freight service options of the list of freight service options, wherein each visual representation of the service option interactive list (a) represents a transportation option for shipping the freight from a geographic location, and (b) is movable to a corresponding visual node on the route configuration diagram;
receiving drag and drop user input data, via the graphical user interface, to move a particular visual representation of the service option interactive list to a particular visual node on the route configuration diagram, whereby a particular freight service option, represented by the particular visual representation, is associated with a particular geographical location represented by the particular visual node;
based on the particular freight service option being associated with the particular geographical location in the route configuration diagram, generating a freight shipping plan to ship freight between the beginning geographical location and the destination geographical location;
wherein the freight shipping plan comprises executing the particular freight service option at the particular geographical location.

11. The system of claim 10, wherein the computer device is further configured to perform:
wherein the graphical user interface comprises a plurality of geographic locations comprising the beginning geographical location and the destination geographical location;
receiving user input route configuration data, via the graphical user interface, that indicates the route configuration.

12. The system of claim 10, wherein:
the graphical user interface comprises:
a geographical interactive list of visual representations of geographical locations that comprises the beginning geographical location and the destination geographical location,
the graphical user interface is configured for user interaction with the route configuration diagram comprising one or more of:
removing a first geographical location from the route configuration diagram by removing a visual node, of the one or more visual nodes, that represents the first geographical location, or
adding a second geographical location to the route configuration diagram by moving a visual representation of the second geographical location from the geographical interactive list to the route configuration diagram to create a new visual node in the route configuration diagram.

13. The system of claim 10, wherein the computer device is further configured to perform:
automatically generating, using the freight service data in the database, the set of one or more freight service options, each freight service option in the set of one or more freight service options being represented according to a standard format.

14. The system of claim 13, wherein the computer device is further configured to perform:
collecting data related to historical freight shipping options;
generating standard data representing the collected data related to historical freight shipping options; and
adding the generated standard data to the set of one or more freight service options.

15. The system of claim 13, wherein the freight service data represents two or more freight service options and the two or more freight service options are presented in different formats when received from the one or more vendors; and wherein the standard format is based on user preference data.

16. The system of claim 10, wherein the route configuration further comprises at least one rendezvous point geographical location, the rendezvous point geographical location representing a location for freight shipping between the beginning geographical location and the destination geographical location.

17. The system of claim 10, wherein the computer device is further configured to perform:
receiving user preference data that indicates one or more of:
a price range of freight service options,
time in transit,
a range of dates of arrival,
method of transportation,
previous transactions with vendors,
history of completion of service of vendors,
one or more vendor recommendations, or
selection of a freight service option for a portion of the route configuration;
based, at least in part, on the user preference data, eliminating, from the list of freight service options, particular one or more freight service options.

18. The system of claim 10, wherein the computer device is further configured to perform:
receiving, from a user, a sorting metric that indicates one or more of:
fastest method of movement,
weight limitations,
choice of vendor,
cost effectiveness,
quality of service, or
history of completion of service;
sorting the list of freight service options by at least the sorting metric.

* * * * *

UNITED STATES PATENT AND TRADEMARK OFFICE
CERTIFICATE OF CORRECTION

PATENT NO. : 11,257,027 B2
APPLICATION NO. : 15/826410
DATED : February 22, 2022
INVENTOR(S) : Andrew Coyle et al.

It is certified that error appears in the above-identified patent and that said Letters Patent is hereby corrected as shown below:

In the Claims

Column 20, Line 22 delete "more options" and insert --more freight service options--

Signed and Sealed this
Sixteenth Day of August, 2022

Katherine Kelly Vidal
*Director of the United States Patent and Trademark Office*